United States Patent
Griffith et al.

(10) Patent No.: US 7,996,835 B2
(45) Date of Patent: Aug. 9, 2011

(54) SYSTEM, METHOD AND PROGRAM FOR MANAGING COMMUNICATION WITH MULTIPLE CONFIGURATIONS FOR VIRTUAL MACHINE

(75) Inventors: Daniel M. Griffith, Endicott, NY (US); James P. McCormick, III, Endwell, NY (US); Damian L. Osisek, Vestal, NY (US); William Romney White, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 1338 days.

(21) Appl. No.: 11/545,291

(22) Filed: Oct. 10, 2006

(65) Prior Publication Data
US 2008/0086726 A1 Apr. 10, 2008

(51) Int. Cl.
G06F 9/455 (2006.01)
G06F 9/46 (2006.01)
G06F 13/00 (2006.01)
G06F 13/24 (2006.01)

(52) U.S. Cl. ............ 718/1; 718/100; 718/101; 719/313; 719/318; 719/319; 710/260; 710/266; 710/268

(58) Field of Classification Search .................. 718/1
See application file for complete search history.

(56) References Cited

U.S. PATENT DOCUMENTS

| | | | |
|---|---|---|---|
| 4,660,144 A * | 4/1987 | Walsh | 718/1 |
| 4,831,541 A * | 5/1989 | Eshel | 718/100 |
| 4,975,836 A * | 12/1990 | Hirosawa et al. | 718/100 |
| 5,996,026 A | 11/1999 | Onodera et al. | 710/3 |
| 6,052,739 A | 4/2000 | Bopardikar et al. | 709/301 |
| 7,257,811 B2 * | 8/2007 | Hunt et al. | 718/1 |
| 7,900,204 B2 * | 3/2011 | Bennett et al. | 718/1 |
| 2003/0037089 A1 * | 2/2003 | Cota-Robles et al. | 709/1 |
| 2003/0212884 A1 | 11/2003 | Lee et al. | 713/1 |
| 2005/0080970 A1 | 4/2005 | Jeyasingh et al. | 710/266 |
| 2005/0251806 A1 | 11/2005 | Auslander et al. | 718/100 |
| 2006/0123416 A1 * | 6/2006 | Cibrario Bertolotti et al. | 718/1 |
| 2007/0028238 A1 * | 2/2007 | Bennett et al. | 718/1 |

* cited by examiner

*Primary Examiner* — Meng A An
*Assistant Examiner* — Abdullah Al Kawsar
(74) *Attorney, Agent, or Firm* — Dennis Jung

(57) ABSTRACT

System, method and program product for managing a plurality of configurations of a first virtual machine. A command is received to set the configuration of the first virtual machine for processing a next incoming interaction and subsequent incoming interactions of at least one protocol from one or more other virtual machines to a configuration exhibited by the first virtual machine which first subsequently prepares to receive the next incoming interaction. The configuration exhibited by the first virtual machine which first prepared to receive the next incoming interaction is determined. The first virtual machine configuration which first prepared to receive the next incoming interaction processes the next incoming interaction.

17 Claims, 4 Drawing Sheets

SYSTEM, METHOD AND PROGRAM FOR MANAGING COMMUNICATION WITH MULTIPLE CONFIGURATIONS FOR VIRTUAL MACHINE

FIELD OF THE INVENTION

The present invention relates generally to virtual machine operating systems, and more specifically, to determination of one of a plurality of predetermined configurations of a virtual machine in which to process an incoming message.

BACKGROUND OF THE INVENTION

Virtual machine operating systems are well known today. For example, an IBM z/VM operating system creates a virtual machine environment, as follows. A base operating system (also known as a Control Program, "CP" or hypervisor) of the IBM z/VM virtual machine operating system logically divides physical resources, i.e. CPU time, RAM, storage, etc. of a real computer to form different virtual machines. Thus, each virtual machine has a share of processor time, RAM, storage, etc. to form a virtual computer and execute is own "guest" operating system and applications. The guest operating system and applications operate (i.e. use their virtual machine's share of processor time, RAM, storage, etc.) in the respective virtual machine as if they were executing in their own dedicated real computer.

Programs in different virtual machines can also communicate with each other through a hypervisor. According to one communication technique, the communication between the different virtual machines via the hypervisor may comprise messages using proprietary protocols such as Inter-User Communication Vehicle ("IUCV") or Virtual Machine Control Facility ("VMCF"). These communication protocols exhibit the following common properties:

a) The source virtual machine first writes the message into the source's virtual address space.
b) The source virtual machine identifies the target virtual machine by name.
c) The hypervisor generates an interrupt to notify the target virtual machine of the incoming message. The interrupt invokes interrupt handling in the target virtual machine.
d) In response to the target virtual machine agreeing to receive the message, the hypervisor copies the message from the source's virtual address space to the target virtual machine's virtual address space.

The following is a more detailed description of IUCV. IUCV is a point-to-point protocol to transfer data from one source virtual machine to one target virtual machine. To communicate via IUCV protocol, a source virtual machine first prepares to receive communications by invoking the hypervisor to declare an IUCV buffer for interrupts and incoming messages. To initiate communication, a source virtual machine then invokes the hypervisor indicating the identity of the intended target virtual machine for the communication. If the target has agreed to communicate by having declared an IUCV buffer for interrupts and incoming messages, the hypervisor generates an interrupt to the target virtual machine and provides the target virtual machine with a communication path id for this connection. Assuming the target virtual machine agrees to communicate with the source virtual machine, the target virtual machine invokes the hypervisor to accept the communication path. The hypervisor then interrupts the source virtual machine and provides the source virtual machine with its communication path id for this connection. To send the actual message, the source virtual machine invokes the hypervisor indicating the previously obtained path id and the actual message to be sent. In response, the hypervisor uses the path id to identify the target virtual machine and generates an interrupt to the target virtual machine. The target virtual machine responds to the interrupt by invoking the hypervisor to receive the actual message. The hypervisor then copies the data from the source virtual machine's virtual address space to the target virtual machine's virtual address space and generates an interrupt to the source virtual machine indicating that the data has been transferred. The program in the target virtual machine can then read the message from the target virtual machine's address space.

The following is a more detailed description of VMCF. VMCF is a protocol to transfer data from a source virtual machine to a target virtual machine. To communicate using VMCF, a source virtual machine first prepares to receive communications by invoking the hypervisor to authorize its use of VMCF and declare an area of its storage as a VMCF interruption buffer. To send an actual message, the source virtual machine constructs the message to be transmitted and invokes the hypervisor to deliver it to a designated target virtual machine, which the source virtual machine identifies by name. If the target virtual machine has also authorized its use of VMCF, the hypervisor generates a VMCF interrupt to the target virtual machine. The target virtual machine responds to the interrupt by invoking the hypervisor to receive the actual message. The hypervisor then copies the data from the source virtual machine's virtual address space to the target virtual machine's virtual address space and generates an interrupt to the source virtual machine indicating that the data has been transferred. The program in the target virtual machine can then read the message from the target virtual machine's address space.

Thus, whereas IUCV is a connection-oriented protocol in which messages are sent back and forth on an established path, VMCF is a connectionless protocol in which each message is independently addressed to the target virtual machine by name. The term "incoming interaction" is used herein to refer to a request to communicate with a target virtual machine, for example, by a connection request in the case of a connection-oriented protocol like IUCV, or an individual message in the case of a connectionless protocol like VMCF. For further details on the IUCV and VMCF protocols, see *z/VM: CP Programming Services*, IBM order number SC24-6084-02, which document is hereby incorporated by reference as part of the present disclosure.

As long as there is only one configuration per virtual machine, the incoming interactions under IUCV and VMCF can be resolved unambiguously to that single configuration. However, according to U.S. Pat. No. 4,660,144 to Walsh, a single virtual machine can have two (or more) different configurations, all instantiated concurrently and alternately or simultaneously active (dispatchable). Each of the configurations specifies a number of virtual processors, an amount of virtual machine memory, addresses and types of virtual devices, and an associated operating system name or boot device. Each configuration defines an environment to execute an operating system and applications. One configuration may be called a "Principal" or main configuration, and another configuration may be called an "Adjunct" or secondary configuration. When the hypervisor generates an interrupt for an interaction initiated by a configuration of a source virtual machine, there are different known ways for the hypervisor to determine which of a target virtual machine's configurations is to receive and process the interrupt and associated interaction. This determination is necessitated because interactions such as VMCF messages and IUCV connection requests are addressed to a virtual machine, not to a particular configuration that is instantiated within that virtual machine. The interrupt handler associated with each configuration is the one provided by the operating system running in the configuration. It was known to use a predetermined one of the configurations for all incoming interactions and associated interrupts. A problem with this approach is that the other configuration is precluded from handling any incoming interactions and associated interrupts. It was also known to use, for a current interrupt, the configuration that was currently active for the virtual machine. A problem with this approach is that the configuration which is currently active is dynamic and cannot reliably be determined in advance by the virtual machine that initiated the interaction to be the appropriate one to receive the interrupt.

An object of the present invention is to determine which configuration of a target virtual machine is appropriate to process an incoming interaction initiated from a configuration of another virtual machine.

SUMMARY OF THE INVENTION

The present invention resides in a system, method and program product for managing a plurality of configurations of a first virtual machine. A command is received to set the configuration of the first virtual machine for processing a next incoming interaction and subsequent incoming interactions of at least one protocol from one or more other virtual machines to a configuration exhibited by the first virtual machine which first prepares to receive the next incoming interaction. The configuration exhibited by the first virtual machine which first prepared to receive the next incoming interaction is determined. The first virtual machine configuration which first prepared to receive the next incoming interaction processes the next incoming interaction.

According to a feature of the present invention, a configuration of the first virtual machine prepares to receive the next incoming interaction for a connection-oriented protocol by declaring a buffer to receive incoming connection requests and/or enabling for an interrupt notifying said first virtual machine of the incoming connection request. Subsequent incoming connection requests for the first virtual machine are then directed to the determined configuration. Any communication path previously established by either configuration accepting a prior incoming connection request remains intact, and messages along such a path continue to travel to the configuration that accepted the connection for which that path was established.

According to another feature of the present invention, a configuration of the first virtual machine prepares to receive the next incoming interaction for a connectionless protocol by authorizing itself to receive incoming messages and identifying an interruption buffer. Subsequent incoming messages for the first virtual machine through said connectionless protocol are then directed to the determined configuration.

DETAILED DESCRIPTION OF THE PREFERRED EMBODIMENTS

Figure 1:
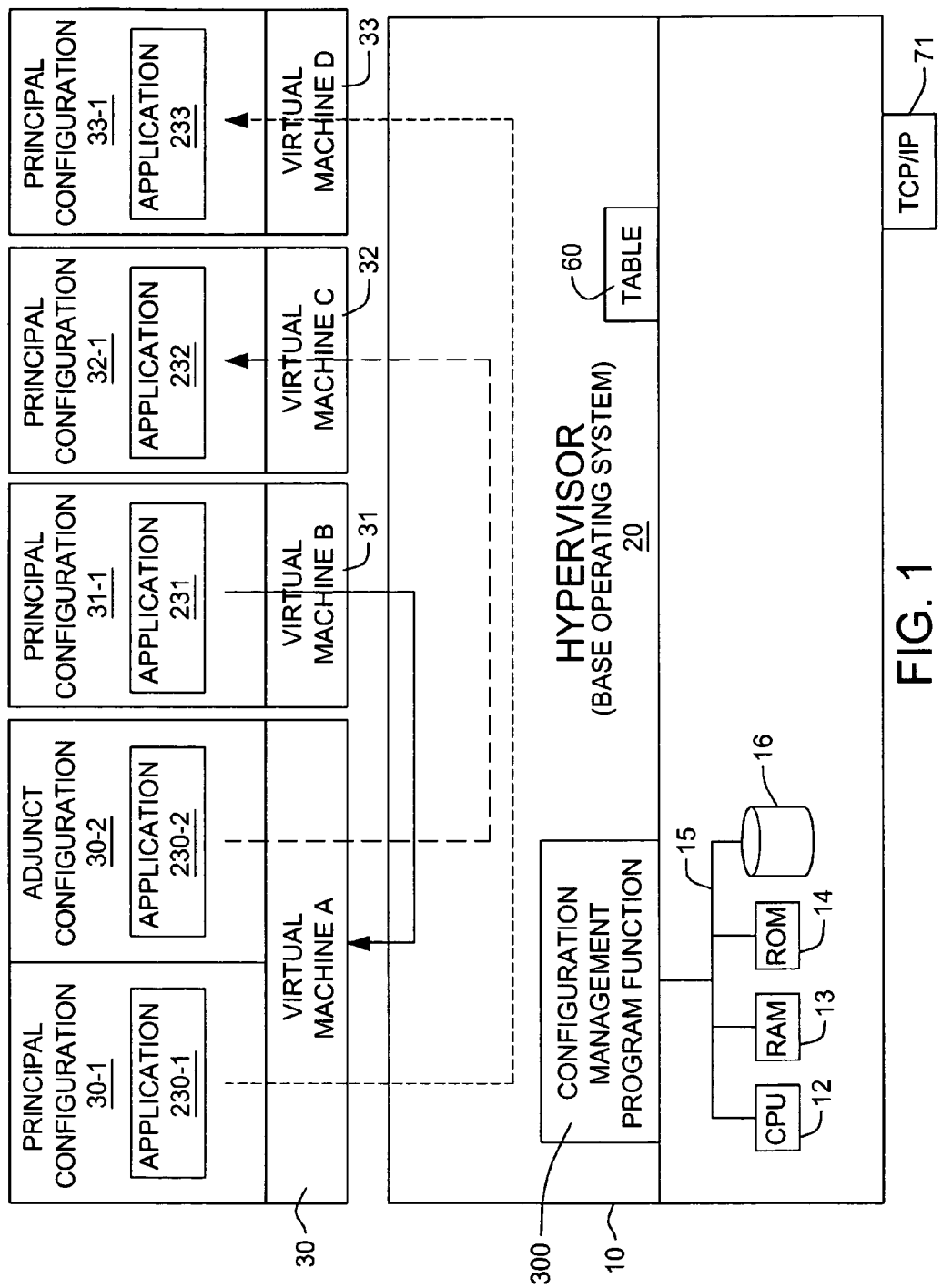
FIG. 1 is a block diagram of multiple virtual machines communicating with one another under the control of a hypervisor program; one (or more) of the virtual machines comprises two instantiated configurations.

FIG. 1 illustrates a real computer system 10 comprising a CPU 12 (which includes one or more processors), RAM 13 and ROM 14 on a common bus 15, and storage 16. A base operating system or hypervisor program 20 has logically divided the real resources (a share of total CPU time or a number of virtual processors of said CPU, RAM, ROM, storage, etc.) of real computer system 10 into virtual machines 30-33. Thus, each virtual machine 30-33 comprises one or more configurations. Two different configurations 30-1 and 30-2 are illustrated for virtual machine 30. Although only one configuration is illustrated for virtual machines 31-33, each virtual machine 31-33 can have two different configurations as well. Each configuration is a functional unit and executes a respective guest operating system. One or more applications 230-1, 230-2, 231, 232 and 233 also execute in each configuration. (Although only one application is illustrated in each of configurations 30-1, 30-2, 31-1, 32-1, and 33-1, there could be multiple applications in each configuration.) The hypervisor 20 has a private memory that it can use to perform functions for the virtual machines, as described below. Although virtual machine 30 has more than one active configuration, only one configuration is used to handle each interrupt and process the associated interaction from the source virtual machine configuration. In the illustrated embodiment, virtual machine 30 has a principal configuration 30-1 and an adjunct configuration 30-2, and each of virtual machines 31,32,33 has a single (principal) configuration 31-1, 32-1 and 33-1, respectively. By way of example, each of the configurations specifies a number of virtual processors, an amount of virtual machine memory, addresses and types of virtual devices, and an associated operating system name or boot device. For example, each configuration may use a different operating system than the other configurations; this improves the versatility of the virtual machine insofar as the types of applications which can execute. This allows an operating system being debugged to run in the principal configuration, and an operating system running a debugging tool to run in the adjunct configuration. As another example, the different configurations can have significantly different "sizes" insofar as the number of virtual processors and amount of memory allocated to them.

Each configuration of a source virtual machine can communicate with any of the configurations of other virtual machines via the hypervisor program 20. This communication may be performed using a variety of protocols, such as IUCV or VMCF. Communication with IUCV is connection-oriented. Once a connection path is established, the messages that flow across it are delivered between two specific configurations of the communicating virtual machines. However, the request to establish a connection addresses the target virtual machine by name and does not designate a particular configuration within that virtual machine. Communication using VMCF is connectionless. Every message is addressed to the target virtual machine by name and not to a particular configuration within that virtual machine.

In both IUCV and VMCF, there are interactions that depend on the target virtual machine name. For IUCV, these interactions include connection requests, to establish communication paths; in VMCF, the interactions identify the destination for individual messages. In accordance with the present invention, the hypervisor program 20 determines the proper configuration of the target virtual machine for handling incoming interactions such as incoming connection requests and messages and interrupts, based on the following. If an administrator previously set/configured the virtual machine for the "Principal Configuration" to handle incoming interactions and associated interrupts, then whenever an interrupt is required, the hypervisor forwards the interrupt and associated interaction to the principal configuration of the target virtual machine for handling. In response, the principal configuration of the target virtual machine will also process the associated interaction. Conversely, if an administrator previously set the virtual machine for the "Adjunct Configuration" to handle incoming interactions and associated interrupts, then whenever an interrupt is required, the hypervisor forwards the interrupt and associated interaction to the adjunct configuration of the target virtual machine for handling. In response, the adjunct configuration of the target virtual machine will also process the associated interaction. However, if an administrator previously set/configured the virtual machine for the "First Configuration to Prepare" for incoming interactions to handle them, then the configuration that is subsequently first to declare an IUCV buffer to the hypervisor or issue a VMCF Authorize to the hypervisor is the configuration of the target virtual machine to handle the interrupt and associated interaction, as well as all subsequent interrupts associated with incoming interactions, and those associated interactions (until the setting is changed by another SET command).

In effect, the setting is a three-way switch. This switch can be set to direct all incoming interactions to the principal configuration, to direct them all to the adjunct configuration, or to direct them to the configuration that is the first to prepare for them.

Figure 2:
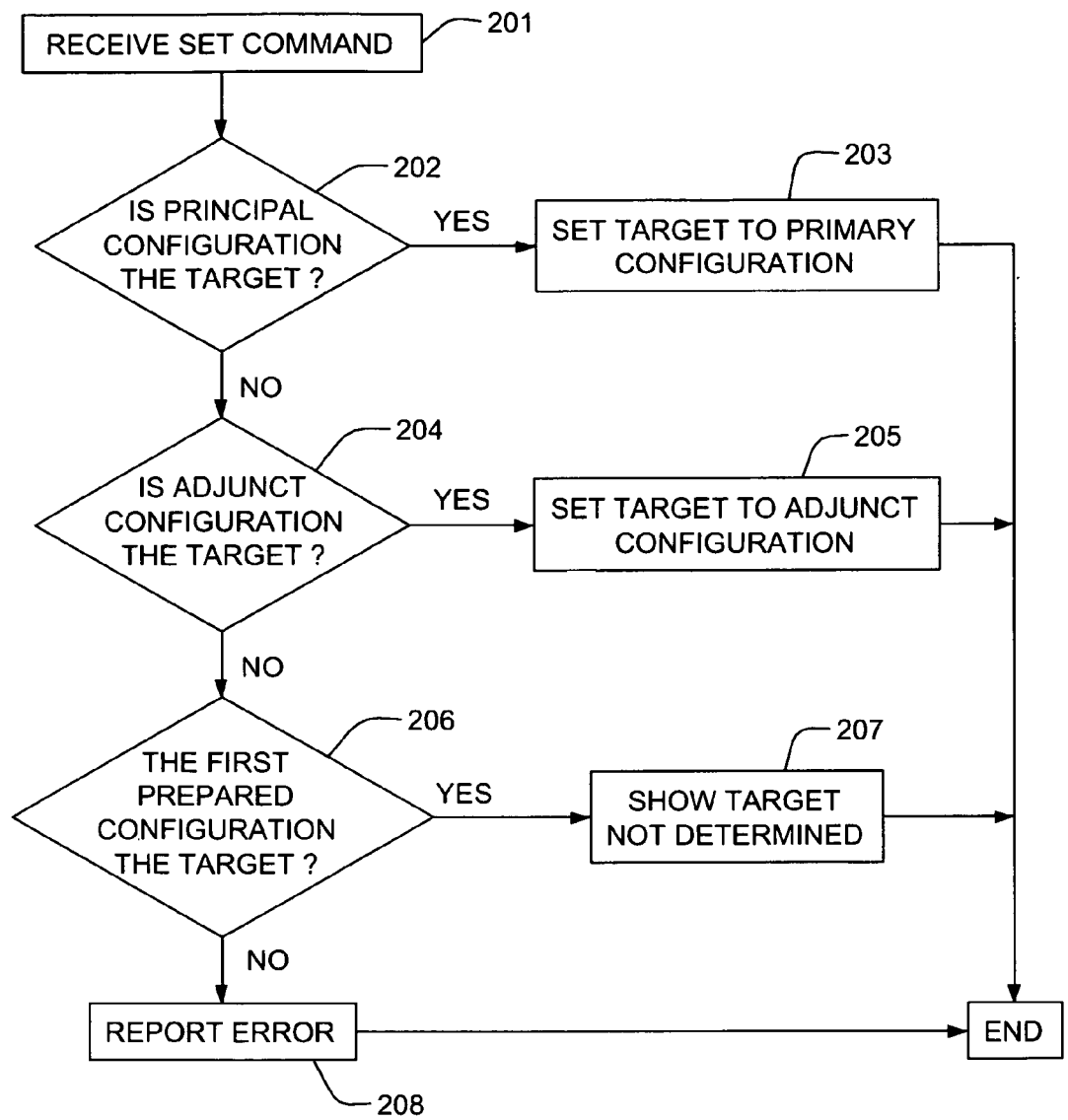
FIG. 2 is a flow chart of part of a configuration management program function within the hypervisor program of FIG. 1 that allows a user to SET the configuration of each target virtual machine for processing incoming messages, to Principal configuration, Adjunct configuration or "First Configuration to Prepare" for incoming interactions, in accordance with the present invention.

FIG. 2 illustrates a configuration management program function 300 within hypervisor program 20 which enables a user via a SET command with appropriate parameters to set the configuration (i.e. "Principal Configuration", "Adjunct Configuration" or "First Configuration to Prepare") for each virtual machine. Program function 300 receives a SET command from the user or from another application (step 201) and reads the associated parameter to determine if the setting is for "Principal Configuration", "Adjunct Configuration" or "First Configuration to Prepare". If the setting is for "Principal Configuration" (decision 202, yes branch and step 203), then program function 300 records in a table 60 (in private memory of hypervisor 20) that any IUCV connection requests or VMCF messages (or other protocol incoming interactions) and associated interrupts targeted for this virtual machine should be processed by the target virtual machine's principal configuration. If the setting is for "Adjunct configuration" (decision 202, no branch, decision 204, yes branch and step 205) then program function 300 records in table 60 that any IUCV connection requests or VMCF messages (or other protocol incoming interactions) targeted for this virtual machine should be processed by the target virtual machine's adjunct configuration. If the setting is for "First Configuration to Prepare" (decision 202, no branch, decision 204, no branch and decision 206, yes branch and step 207), then program function 300 records in table 60 that the configuration is not predetermined, and any IUCV connection requests or VMCF messages (or other protocol incoming interactions) targeted for this virtual machine should be processed by the virtual machine's configuration that first subsequently declares an IUCV buffer (or otherwise prepares for an incoming interaction of another protocol). If the SET command does not comply with the any of the foregoing, then program function 300 reports an error to the user (step 208).

Figure 3:
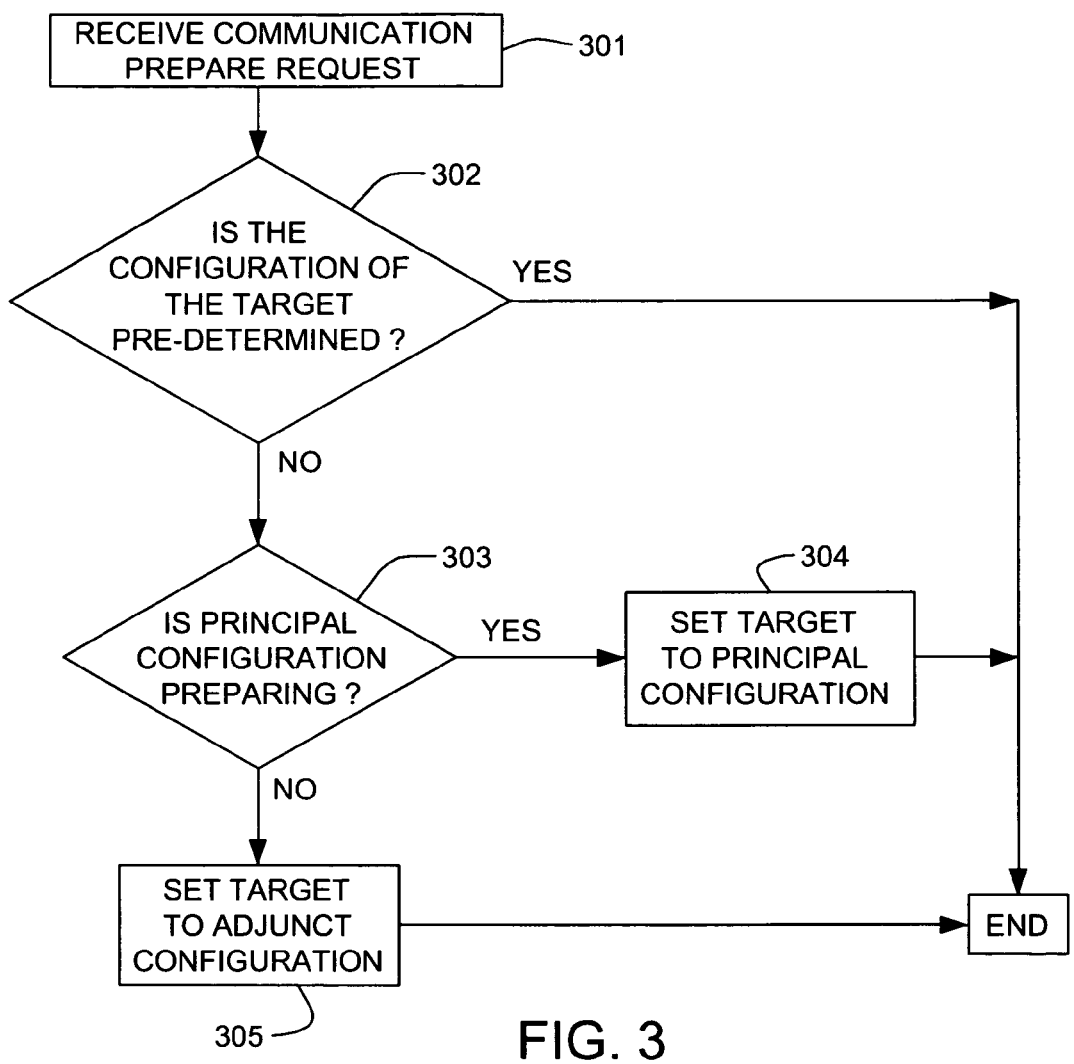
FIG. 3 is a flow chart of another part of the configuration management program function within the hypervisor program of FIG. 1 which dynamically determines which configuration to use for an incoming interaction when the SET command specifies "First Configuration to Prepare" for incoming interactions.

FIG. 3 illustrates operation of configuration management program function 300 to dynamically determine the proper target virtual machine configuration to use when the SET command processed in the steps of FIG. 2 indicated "First Configuration to Prepare". The steps of FIG. 3 are performed separately for each virtual machine 30-33. In step 301, program function 300 receives from either configuration of the virtual machine, principal or adjunct, a request to prepare for an incoming communication by declaring an IUCV buffer or issuing a VMCF Authorize command (or taking other action in accordance with another protocol to prepare for an incoming interaction of this other protocol).

In one embodiment of the present invention, when the virtual machine prepares for either type of incoming communication (IUCV or VMCF) (or any other type of incoming communication in another protocol), and the virtual machine's configuration was not predetermined by the SET command—decision 302, no branch, then the program function 300 determines the configuration of the target virtual machine (principal or adjunct) which first prepared for the communication as the configuration of the virtual machine that will process the next IUCV or VMCF (or other protocol) interaction and associated interrupts. Thus, if the target virtual machine's principal configuration was or is first to prepare for the next IUCV or VMCF (or other protocol) interaction (decision 303, yes branch), then program function 300 dynamically assigns the principal configuration for future incoming IUCV or VMCF interactions and associated interrupts (step 304). However, if the virtual machine's adjunct configuration was or is first to prepare for the incoming IUCV or VMCF (or other protocol) interaction (decision 303, no branch), then program function 300 dynamically assigns the adjunct configuration for future incoming IUCV or VMCF (or other protocol) interactions and associated interrupts (step 305).

Figure 4:
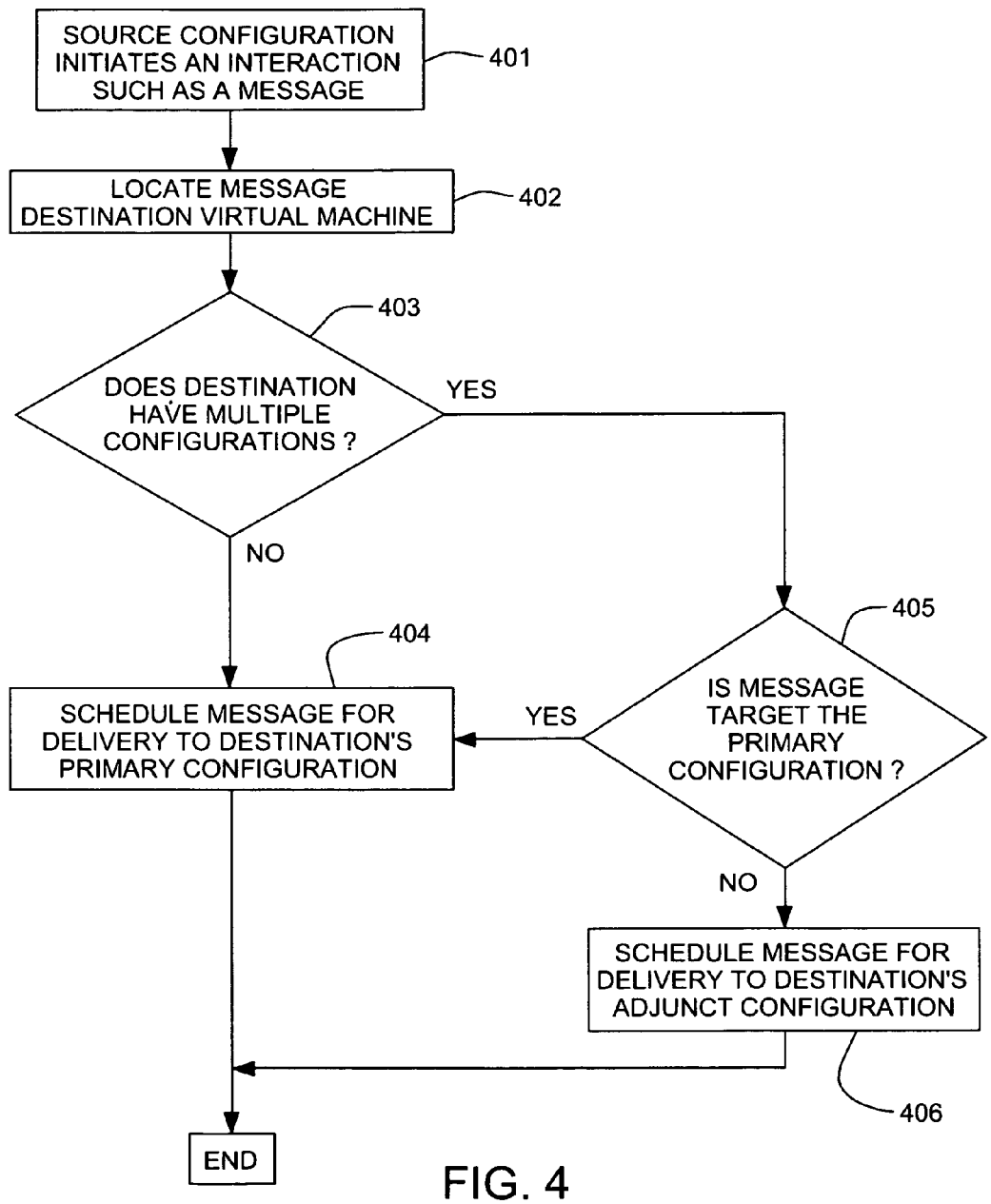
FIG. 4 is a flow chart of another function within the hypervisor program of FIG. 1 to forward an interaction from a configuration of a source virtual machine to a target virtual machine and deliver it to the proper configuration of the target virtual machine according to the SET command.

FIG. 4 illustrates processing by program function 300 when the hypervisor 20 is notified that a configuration of a source virtual machine wants to initiate an interaction with a configuration of a target virtual machine. In step 401, program function 300 receives notification from the source virtual machine configuration of a VMCF message or an IUCV connection request that is addressed to a target virtual machine. From an address parameter in the interaction, hypervisor 20 identifies the target virtual machine (step 402), and then determines if the target virtual machine has more than one instantiated configuration (decision 403). If not (decision 403, no branch), then the hypervisor 20 initiates the interrupts and other processing as appropriate for the protocol of the interaction and schedules delivery of the interaction to the target virtual machine (step 404). The virtual machine has only one possible configuration, so hypervisor 20 need not take any action to determine this configuration. Referring again to decision 403, yes branch, where the target virtual machine has two or more possible configurations (principal and adjunct), then hypervisor 20 calls the program function 300 to determine from table 60 the proper configuration of the target virtual machine to use for the interaction and associated interrupt to the target virtual machine. As explained above with reference to FIGS. 2 and 3, program function 300 will know the proper configuration of the target virtual machine to use either based on a predetermined configuration type specified in the Set Command or based on the "First Configuration to Prepare" (if this was the parameter of the SET Command) and which configuration was first to prepare for the incoming interaction. If the proper configuration is the principal configuration (either based on the "Principal Configuration" parameter accompanying the SET command, or the principal configuration being first to prepare in the case of the SET command being "First Configuration to Prepare") (decision 405, yes branch), then program function 300 of the hypervisor 20 selects the principal configuration as the proper configuration for this interaction and associated interrupt, and the hypervisor 20 initiates the interrupt as appropriate and schedules delivery of the interaction to the target virtual machine's principal configuration (step 404). However, if the proper configuration is the adjunct configuration (either based on the "Adjunct Configuration" parameter accompanying the SET command, or the adjunct configuration being first to prepare in the case of the SET command being "First Configuration to Prepare") (decision 405, no branch), then program function 300 of the hypervisor selects the adjunct configuration as the proper configuration for this interaction and associated interrupt, and the hypervisor 20 initiates the interrupts as appropriate for the protocol of the incoming interaction and schedules delivery of the interaction to the target virtual machine's adjunct configuration (step 406).

The following is an example of use of the present invention. The principal configuration initially runs an operating system such as IBM CMS operating system which uses VMCF and IUCV. The CMS operating system in the principal configuration is the first (and only) configuration to prepare. Later, the principal configuration is reset and another operating system such as z/OS or Linux, which does not use VMCF or IUCV, is loaded into the principal configuration. Then, a CMS-based debugger is brought up in the adjunct configuration. In this example, communications will be available to the adjunct configuration for use by CMS and the debugger.

Hypervisor program 20 including configuration management program function 300 can be loaded into computer 10 from a computer readable media such as magnetic tape or disk, optical media, DVD, memory stick, semiconductor memory, etc. or downloaded from the Internet via TCP/IP adapter card 71.

Based on the foregoing, a system, method and program product for managing communication with multiple configurations of a virtual machine have been disclosed. However, numerous modifications and substitutions can be made without deviating from the scope of the present invention. Therefore, the present invention has been disclosed by way of illustration and not limitation, and reference to the following claims should be made to determine the scope of the present invention.

What is claimed:

1. A method for managing incoming interactions with a first virtual machine having a plurality of configurations, said method comprising the steps of:
    receiving a command to set a configuration of said first virtual machine for processing a next incoming interaction and subsequent incoming interactions of at least one protocol from one or more other virtual machines to said configuration exhibited by said first virtual machine which first prepares to receive said next incoming interaction after said command was received;
    determining said configuration exhibited by said first virtual machine which first prepared to receive said next incoming interaction after said command was received; and
    said first virtual machine configuration which first prepared to receive said next incoming interaction processing said next incoming interaction; and
    wherein each of said configurations specifies at least two of the following: a number of virtual processors, an amount of virtual machine memory, addresses and types of virtual devices, and an associated operating system name or boot device.

2. A method as set forth in claim 1 wherein the step of receiving a command to set the configuration of said first virtual machine for processing a next incoming interaction and subsequent incoming interactions of at least one protocol from one or more other virtual machines comprises the step of receiving a command to set the configuration of said first virtual machine for processing a next incoming interaction and subsequent incoming interactions of at least two protocols from one or more other virtual machines.

3. A method as set forth in claim 2 wherein said two protocols comprise Inter-User Communication Vehicle and Virtual Machine Control Facility protocols.

4. A method as set forth in claim 1 wherein a configuration of said first virtual machine first prepared to receive said next incoming interaction by declaring at least one of a buffer to receive said incoming interaction and an interrupt notifying said first virtual machine of said next incoming interaction.

5. A method as set forth in claim 1 wherein a configuration of said first virtual machine first prepared to receive said next incoming interaction by authorizing itself to receive said next incoming interaction and identifying an interruption buffer.

6. A method as set forth in claim 1 wherein said at least one protocol is a connection-oriented protocol, and said incoming interaction is a connection request.

7. A method as set forth in claim 1 wherein said at least one protocol is a connectionless protocol, and said incoming interaction is a message.

8. A system for managing a plurality of configurations of a first virtual machine, said system comprising at least one computer processor for:
    receiving a command to set a configuration of said first virtual machine for processing a next incoming interaction and subsequent incoming interactions of at least one protocol from one or more other virtual machines to said configuration exhibited by said first virtual machine which first prepares to receive said next incoming interaction after said command was received;
    determining said configuration exhibited by said first virtual machine which first prepared to receive said next incoming interaction after said command was received; and
    said first virtual machine configuration which first prepared to receive said next incoming interaction including means for processing said next incoming interaction; and
    wherein each of said configurations specifies at least two of the following: a number of virtual processors, an amount of virtual machine memory, addresses and types of virtual devices, and an associated operating system name or boot device.

9. A system as set forth in claim 8 wherein receiving a command to set the configuration of said first virtual machine for processing a next incoming interaction and subsequent incoming interactions of at least one protocol from one or more other virtual machines comprises means for receiving a command to set the configuration of said first virtual machine for processing a next incoming interaction and subsequent incoming interactions of at least two protocols from one or more other virtual machines.

10. A system as set forth in claim 9 wherein said two protocols comprise Inter-User Communication Vehicle and Virtual Machine Control Facility protocols.

11. A system as set forth in claim 8 wherein a configuration of said first virtual machine first prepared to receive said next incoming interaction by declaring at least one of a buffer to receive said incoming interaction and an interrupt notifying said first virtual machine of said next incoming interaction.

12. A system as set forth in claim 8 wherein a configuration of said first virtual machine first prepared to receive said next incoming interaction by authorizing itself to receive said next incoming interaction and identifying an interruption buffer.

13. A computer program product having instructions stored in a computer readable media when executed by a processor for managing a plurality of configurations of a first virtual machine, said computer program product comprising:

first program instructions to receive a command to set a configuration of said first virtual machine for processing a next incoming interaction and subsequent incoming interactions of at least one protocol from one or more other virtual machines to said configuration exhibited by said first virtual machine which first prepares to receive said next incoming interaction after said command was received;

second program instructions to determine said configuration exhibited by said first virtual machine which first prepared to receive said next incoming interaction after said command was received; and third program instructions for execution within said first virtual machine configuration which first prepared to receive said next incoming interaction to process said next incoming interaction; and wherein each of said configurations specifies at least two of the following: a number of virtual processors, an amount of virtual machine memory, addresses and types of virtual devices, and an associated operating system name or boot device.

14. A computer program product as set forth in claim 13 wherein the first program instructions comprise fourth program instructions to receive a command to set the configuration of said first virtual machine for processing a next incoming interaction and subsequent incoming interactions of at least two protocols from one or more other virtual machines; and wherein said fourth program instructions are stored on said media in functional form.

15. A computer program product as set forth in claim 14 wherein said two protocols comprise Inter-User Communication Vehicle and Virtual Machine Control Facility protocols.

16. A computer program product as set forth in claim 13 wherein a configuration of said first virtual machine first prepared to receive said next incoming interaction by declaring at least one of a buffer to receive said incoming interaction and an interrupt notifying said first virtual machine of said next incoming interaction.

17. A computer program product as set forth in claim 13 wherein a configuration of said first virtual machine first prepared to receive said next incoming interaction by authorizing itself to receive said next incoming interaction and identifying an interruption buffer.

* * * * *